United States Patent [19]

Williams

[11] 4,223,825
[45] Sep. 23, 1980

[54] METHOD OF FORMING A VEHICLE AXLE ASSEMBLY

[75] Inventor: Gerald D. Williams, Indianapolis, Ind.

[73] Assignee: The Marmon Group, Inc., Chicago, Ill.

[21] Appl. No.: 25,404

[22] Filed: Mar. 30, 1979

[51] Int. Cl.³ .............................................. B23K 20/12
[52] U.S. Cl. ..................................... 228/114; 228/182
[58] Field of Search ............... 228/112, 113, 114, 125, 228/178, 182

[56] References Cited

U.S. PATENT DOCUMENTS

| 3,662,941 | 5/1972 | Gage | 228/112 X |
| 3,750,263 | 8/1973 | Satzler et al. | 228/113 |

FOREIGN PATENT DOCUMENTS 20104  8/1968  Japan ........................................ 228/112

Primary Examiner—Francis S. Husar
Assistant Examiner—K. J. Ramsey
Attorney, Agent, or Firm—Wegner, Stellman, McCord, Wiles & Wood

[57] ABSTRACT

A method of forming a vehicle axle assembly including the steps of coaxially welding a spider having a through opening to a tubular spacer to define a subassembly having a through bore, removing material formed by the welding operation from within the bore, installing the subassembly on an axle beam, and concurrently welding an end of the axle beam and spacer to a spindle.

9 Claims, 6 Drawing Figures

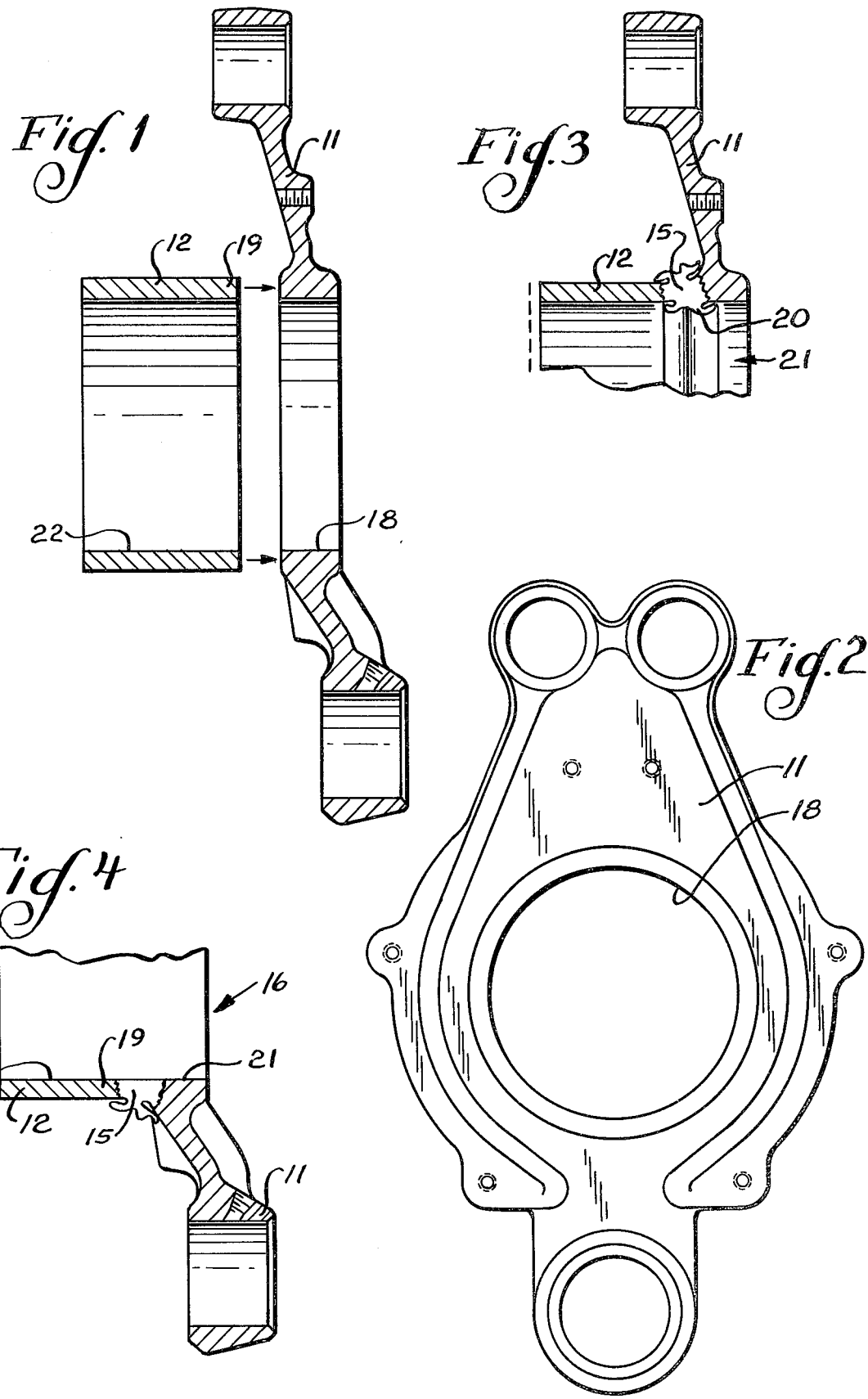

METHOD OF FORMING A VEHICLE AXLE ASSEMBLY

BACKGROUND OF THE INVENTION

1. Field of the Invention

This invention relates to fabrication of vehicle axle assemblies and, in particular, to fabrication of such assemblies utilizing spiders, spider tube spacers, spindles and axle beam tubes.

2. Description of the Prior Art

In the manufacture of vehicle axle assemblies, different elements thereof have been welded in a step-by-step process to define the final completed assembly. The conventional welding processes are time-consuming and, thus, relatively expensive.

SUMMARY OF THE INVENTION

The present invention comprehends an improved method of forming a vehicle axle assembly of components, including a spider, a spider tube spacer, a spindle, and an axle beam tube wherein a number of welded connections are effected concurrently to provide an improved facilitated and low cost manufacture.

The invention comprehends simultaneously welding both the spider and spindle to the axle beam at the end of the axle.

The invention further comprehends the welding of a pair of such subassemblies to opposite ends of the axle concurrently, thus providing further facilitated and low cost manufacture of the vehicle axle assembly.

BRIEF DESCRIPTION OF THE DRAWING

Other features and advantages of the invention will be apparent from the following description taken in connection with the accompanying drawing wherein:

FIG. 1 is a diametric section illustrating a first step in the subassembly of a spider and tubular spacer;

FIG. 2 is an end view of the spider;

FIG. 3 is a fragmentary diametric section illustrating the connection of the tubular spacer to the spider as by a welding operation;

FIG. 4 is a fragmentary diametric section illustrating the subassembly upon completion of a machining operation wherein material formed by the welding operation is removed from the through bore;

DESCRIPTION OF THE PREFERRED EMBODIMENT

Figure 5:
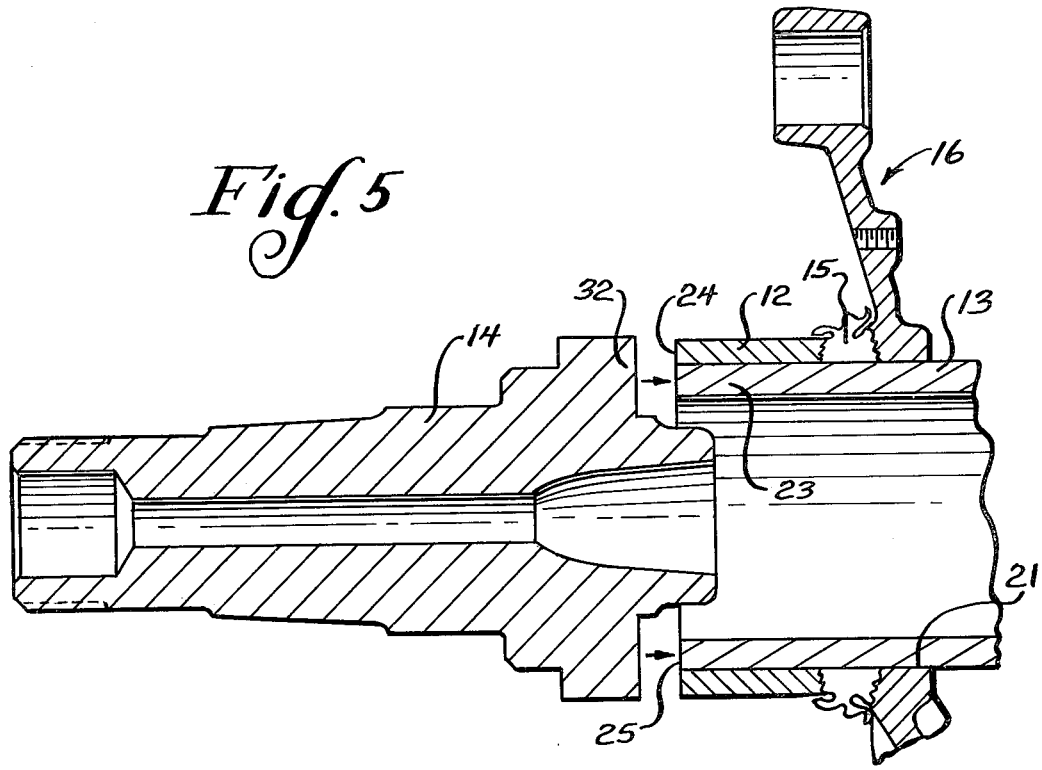
FIG. 5 is a fragmentary diametric section illustrating a further step in the assembly of the subassembly to the spindle.

In the exemplary embodiment of the invention as disclosed in the drawing, an improved vehicle axle assembly generally designated 10 is shown to comprise an assembly of a spider 11, a tubular spacer 12, an axle beam 13, and a spindle 14. The spider is connected to spacer 12 by a first weld 15 to define a subassembly generally designated 16. The subassembly and axle beam 13 are secured to the spindle 14 by a second weld 17 to complete the assembly.

As shown in FIG. 1, spider 11 defines a through opening 18. Tubular spacer 12 defines a first end 19. In a first step of the manufacture, spacer end 19 is welded to the spider coaxially of opening 18. As illustrated in FIG. 3, the welded connection of the spacer to the spider may comprise a friction, or inertia, welded connection wherein a portion of the material formed during the weld, such as portion 20 shown in FIG. 3, projects inwardly into the through bore 21 defined by the coaxially aligned opening 18 of spider 11 and the bore 22 of the tubular spacer.

To complete the subassembly 16, the undesirable weld material 20 is removed from the through bore 21 as by machining to provide a substantially continuous constant diameter bore, as shown in FIG. 4.

Subassembly 16 is then coaxially mounted about the end 23 of the axle beam 13 so as to dispose an outer end 24 of the spacer 12 flush with the outer end 25 of the axle beam end portion 23. As shown in FIG. 5, the machined through bore 21 permits facilitated insertion and fit of the subassembly 16 on the axle beam end 23.

An axially inner end portion 32 of the spindle 14 is then welded to the ends 24 and 25 of the spacer and axle beam, respectively, by weld 17 which, illustratively, may comprise a friction, or inertia, weld. Thus, as seen in FIG. 6, both the subassembly 16 and axle beam are concurrently secured to the spindle by the improved manufacturing operation.

Additionally, the weld 17 may include an outer portion 26 further welding the radially outer surface 27 of the tubular spacer 12 to a radially outer surface 28 of the spindle, thereby providing further improved secured assembly of the axle structure.

Figure 6:
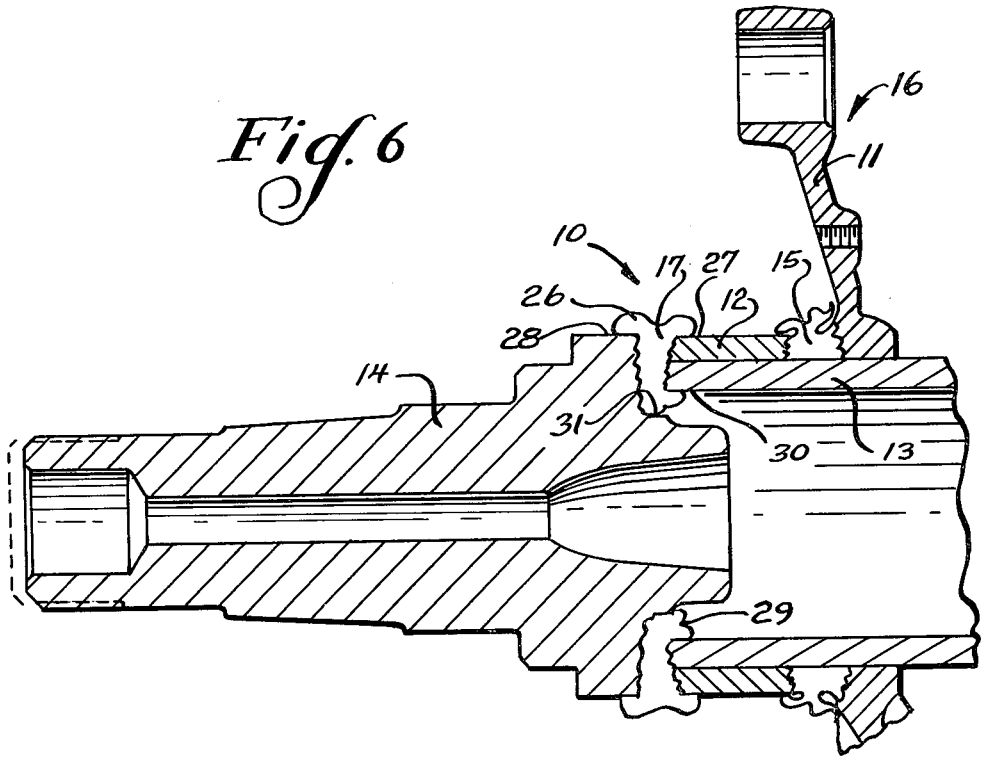
FIG. 6 is a diametric section illustrating the completion of the connection of the spindle to one end of the axle beam in forming the vehicle axle assembly.

As still further shown in FIG. 6, the weld 17 may define a radially inner portion 29 welding a radially inner surface portion 30 of the axle beam 13 to a radially outer surface portion 31 of the spindle 14 and thereby providing a still further improved positive securing of the components in the axle assembly 10.

As further seen in FIG. 6, the inner portion 29 of weld 17 may still further connect the axle beam surface 30 to the end surface portion 32 of spindle 14 providing yet further improved securing of the axle assembly components.

As indicated above, the invention is shown in the drawing pursuant to the connection of the spindle 14 to the subassembly 16 at one end of the axle beam 13. As will be obvious to those skilled in the art, a similar connection of a second spindle 14 at the opposite end of the axle beam 13 may be concurrently effected within the scope of the invention.

The manufacture of the vehicle axle assembly as discussed above comprehended by the present invention is extremely simple and economical while yet providing the highly improved, accurate assembly of the axle components. By permitting the concurrent welding of a number of elements of the axle assembly, a facilitated low cost manufacture is provided.

The foregoing disclosure of specific embodiments is illustrative of the broad inventive concepts comprehended by the invention.

I claim:

1. The method of forming a vehicle axle assembly comprising the steps of:

coaxially welding a spider having a through opening to a tubular spacer to define a subassembly having a through bore;

removing material formed by the welding operation from within the bore;

installing the subassembly on an axle beam; and concurrently welding an end of the axle beam and spacer to a spindle.

2. The method of forming a vehicle axle assembly of claim 1 wherein the step of welding the spider to the spacer comprises a step of friction welding.

3. The method of forming a vehicle axle assembly of claim 1 wherein the step of welding the spider to the spacer comprises a step of inertia welding.

4. The method of forming a vehicle axle assembly of claim 1 wherein the step of including the ends of the axle beam and subassembly to the spindle comprises a step of friction welding.

5. The method of forming a vehicle axle assembly of claim 1 wherein the step of including the ends of the axle beam and subassembly to the spindle comprises a step of inertia welding.

6. The method of forming a vehicle axle assembly of claim 1 wherein the step of removing material from within the bore comprises a step of machining.

7. The method of forming a vehicle axle assembly of claim 1 wherein the step of welding the end of the axle beam and spacer to the spindle comprises a step of welding a radially outer surface portion of the spacer to a radially outer surface portion of the spindle.

8. The method of forming a vehicle axle assembly of claim 1 wherein the step of welding the end of the axle beam and spacer to the spindle comprises a step of welding a radially inner surface portion of the spacer to a radially outer surface portion of the spindle.

9. The method of forming a vehicle axle assembly of claim 1 wherein the step of welding the end of the axle beam and spacer to the spindle comprises a step of welding a radially inner surface portion of the spacer to a radially outer surface portion of the spindle projecting coaxially to within said axle beam.

* * * * *